(12) United States Patent
Wolfe et al.

(10) Patent No.: US 6,368,039 B2
(45) Date of Patent: *Apr. 9, 2002

(54) DUAL FUNCTION RETAINER CLIP

(75) Inventors: Melvin E. Wolfe, Hallstead, PA (US); Gary C. Berray, Port Grane, NY (US)

(73) Assignee: Shop Vac Corporation, Williamsport, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/388,172

(22) Filed: Sep. 1, 1999

(51) Int. Cl.$^7$ .............................. F16B 21/18; H02K 5/00
(52) U.S. Cl. ...................... 411/526; 411/544; 310/91; 107/161
(58) Field of Search .................... 411/525–529, 163, 411/164, 196, 187, 188, 535, 544; 267/161, 163; 304/903; 310/42, 67 R, 91

(56) References Cited

U.S. PATENT DOCUMENTS

| | | | |
|---|---|---|---|
| 362,572 A | * | 5/1887 | Clauss |
| 1,323,188 A | * | 11/1919 | Humphris .................. 411/164 |
| 1,923,399 A | | 8/1933 | Sharp |
| 2,706,491 A | * | 4/1955 | Kohler |
| 2,769,934 A | | 11/1956 | Stone et al. |
| 2,819,417 A | | 1/1958 | Glass |
| 2,845,552 A | | 7/1958 | Robinson |
| 3,002,794 A | | 10/1961 | Bluemink |
| 3,013,167 A | | 12/1961 | Bobula |
| 3,070,409 A | | 12/1962 | Jakel |
| 3,090,318 A | | 5/1963 | Jeep, Jr. et al. |
| 3,107,766 A | | 10/1963 | Pritchard |
| 3,259,383 A | | 7/1966 | Johnson et al. |
| 3,326,509 A | * | 6/1967 | Kuttler .................... 411/527 |
| T861,012 I4 | * | 4/1969 | Mandola |
| 3,483,888 A | | 12/1969 | Wurzel |
| 3,754,802 A | | 8/1973 | Keller |
| 3,794,869 A | | 2/1974 | Apostoleris |
| 4,006,659 A | | 2/1977 | Wurzel et al. |
| 4,236,767 A | | 12/1980 | Feldle |
| 4,245,870 A | | 1/1981 | Punshon et al. |
| 4,364,615 A | | 12/1982 | Euler |
| 4,455,498 A | | 6/1984 | DeSisto |
| 4,608,741 A | * | 9/1986 | Mallet |
| 4,711,590 A | | 12/1987 | Lakin |
| 4,777,395 A | | 10/1988 | Taylor et al. |
| 4,922,144 A | | 5/1990 | Baker et al. |
| 4,924,172 A | | 5/1990 | Boireau et al. |
| 5,139,350 A | | 8/1992 | Gieseler et al. |
| 5,505,548 A | | 4/1996 | Stewart |
| 5,897,281 A | * | 4/1999 | Haga .......................... 411/525 |
| 6,024,177 A | * | 2/2000 | Winebrenner ............... 411/544 |

FOREIGN PATENT DOCUMENTS

| | | | | |
|---|---|---|---|---|
| CA | 1269551 | * | 5/1990 | ................. 411/526 |
| FR | 2 331 704 | | 11/1975 | |
| FR | 2303189 | * | 2/1976 | ................. 411/527 |
| FR | 2 756 885 | | 12/1996 | |
| GB | 1 568 739 | | 6/1977 | |

OTHER PUBLICATIONS

McMaster–Carr Supply Company Catalog, pp. 1, 2361 and 2641, dated 1999.
Specification Sheet from the D.B. Roberts Company, 1 page, dated 1997.
PCT/US00/24462 International Search Report dated Dec. 22, 2000.

* cited by examiner

Primary Examiner—Flemming Saether
(74) Attorney, Agent, or Firm—Marshall, Gerstein & Borun

(57) ABSTRACT

A retainer clip for retaining components on a shaft eliminates the need for a threaded shaft and a hex nut to retain the components on the shaft. The retaining clip includes a main body having a through hole for accommodating the shaft, a plurality of teeth for engaging the shaft and projecting radially inwardly from the main body and a plurality of spring members projecting in a direction transverse to the main body.

17 Claims, 3 Drawing Sheets

# DUAL FUNCTION RETAINER CLIP

TECHNICAL FIELD

The present invention relates generally to fasteners and, more particularly, to retainer clips.

BACKGROUND ART

In many situations it is necessary to secure a motor component located on a motor shaft against axial displacement that would detach the component from the shaft. For example, it is often necessary to affix and axially retain a component, such as an impeller, on a motor shaft after the motor shaft and a motor housing are assembled.

FIG. 1 is a cross-sectional view of a conventional motor assembly that includes a threaded motor shaft 10, a bearing 12, a motor housing 14, a barrel spacer 16, first and second washers 18, 22, a motor component 20, such as an impeller, and a hex nut 24. After the bearing 12 is pressed onto the shaft 10, the shaft 10 is installed into the motor housing 14 with one end of the shaft 10 protruding from the housing 14. The barrel spacer 16 is then fitted onto the shaft 10 into abutment with the bearing 12. After placement on the shaft 10, the barrel spacer 16 also protrudes from the motor housing 14. The first washer 18 is slid onto the protruding end of the shaft 10 and into abutment with the barrel spacer 16. The motor component 20 is slid onto the protruding end of the shaft 10 into abutment with the first washer 18 and the second washer 22 is placed onto the shaft 10 to sandwich the motor component 20 between the two washers 18, 22. The hex nut 24 is then threaded onto the end of the protruding shaft 10 to hold all components on the shaft 10 together in an axial direction. The hex nut 24 applies pressure to the washers 18, 22, which in turn hold the motor component 20 to insure that it rotates as the shaft 10 rotates.

Such conventional motor assemblies are overly difficult to assemble. The hex nut 24 is difficult to tighten because the threaded motor shaft 10 has a tendency to rotate as the hex nut 24 is tightened. Accordingly, assembly of conventional motor components on the threaded shaft requires additional time and the use of additional tools to stabilize the shaft.

SUMMARY OF THE INVENTION

In accordance with the present invention, a retainer clip for retaining a component on a shaft is provided. The retainer clip includes a main body having a hole for accommodating the shaft, a plurality of teeth for engaging the shaft and projecting radially inwardly from the main body, and a plurality of spring members projecting in a direction transverse to the main body.

The present invention may also be embodied in a motor assembly. The motor assembly includes a motor shaft, a motor component placed on the motor shaft and a retainer clip in abutment with the motor component for retaining the motor component on the motor shaft. In this embodiment the retainer clip includes a main body having a hole for accommodating the shaft, a plurality of teeth for engaging the shaft and projecting radially inwardly from the main body, and a plurality of spring members projecting in a direction transverse to the main body.

Other features and advantages of the present invention will become apparent from the attached specification and drawings.

DESCRIPTION OF THE PREFERRED EMBODIMENTS

Figure 1:
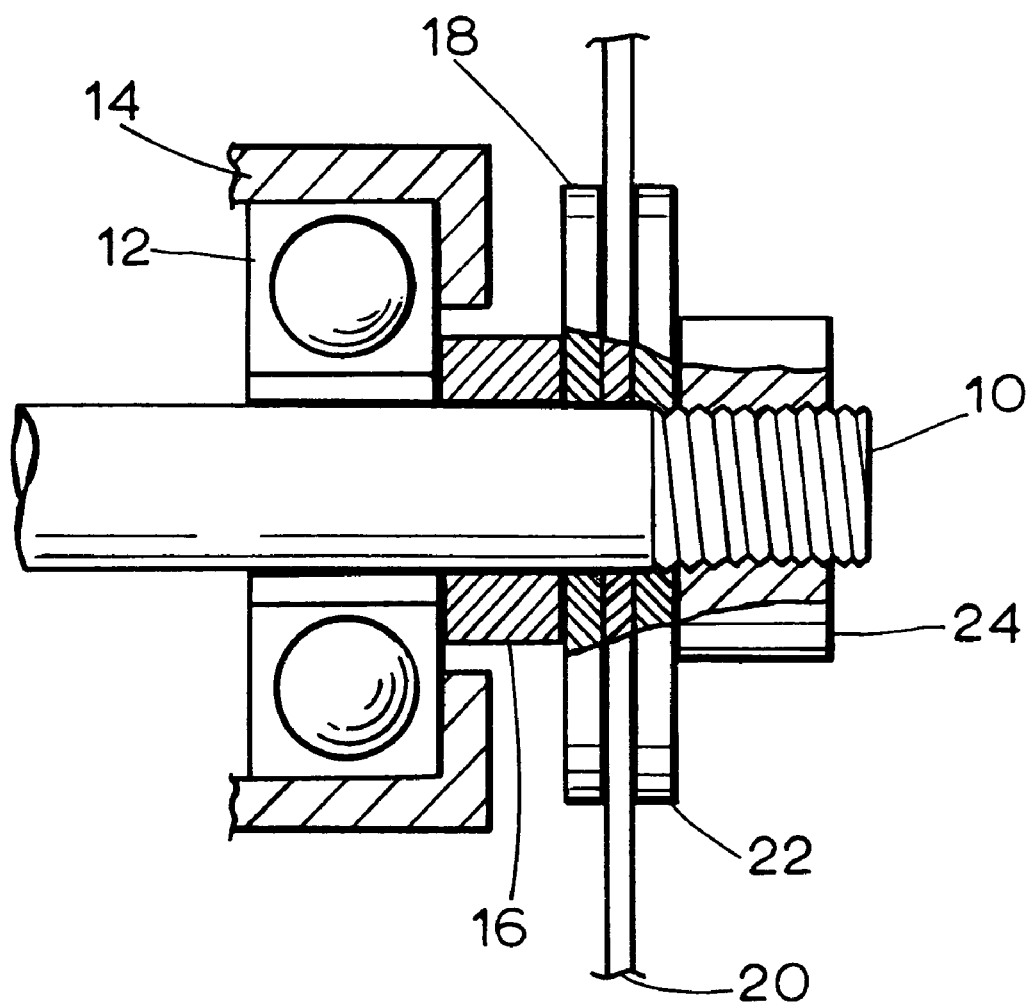
FIG. 1 is a fragmentary, partial cross-sectional view of a conventional motor assembly.
Figure 2:
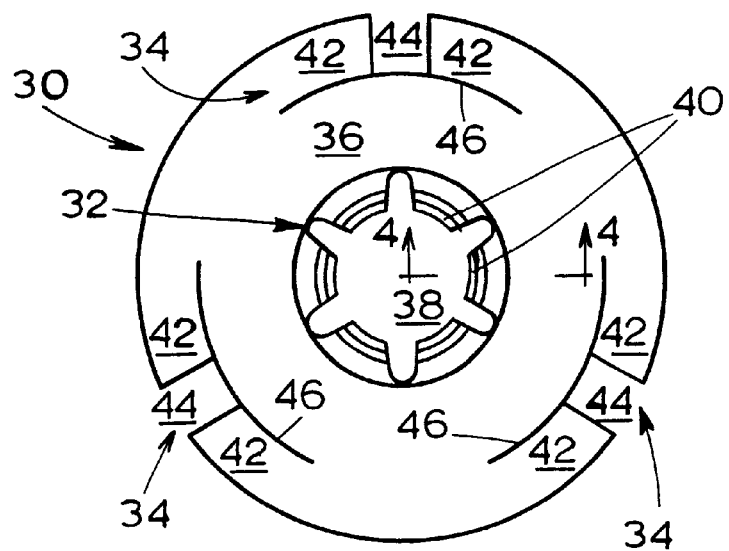
FIG. 2 is a plan view of a retainer clip.
Figure 3:
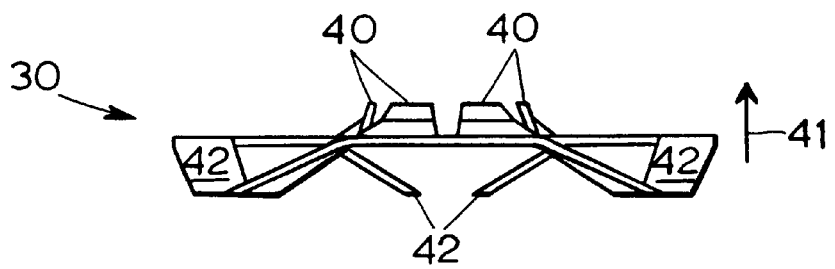
FIG. 3 is a side elevational view of the retainer clip shown in FIG. 2.

Referring to FIGS. 2 and 3, a retainer clip 30 constructed in accordance with the teachings of the present invention includes a first or securing portion 32 that engages a shaft and a second or spring portion 34 that provides a spring force against a member. The spring force may also urge the securing portion 32 into engagement with the shaft. The retainer clip 30 is easy to install and may be used to retain components on the shaft.

The retainer clip 30 is preferably fabricated from a single, substantially planar body or piece of metal, such as steel, and is stamped or otherwise formed. Preferably, the retainer clip 30 has a circular outer periphery, which in the preferred embodiment is approximately 1.12" in diameter. Alternatively, the retainer clip 30 may have a different outer periphery configuration such as square, rectangle, oval, etc. Portions of the planar body are bent or otherwise formed to obtain the retainer clip 30. Referring specifically to FIG. 2, the clip 30 has a circular main body 36 having a through hole 38. A plurality of teeth 40 extend radially inwardly and form the securing portion 32 of the retainer clip 30. As seen specifically in FIGS. 3–5, the teeth 40 preferably project away from the plane of the main body 36 in a first direction as denoted by an arrow 41 shown in FIG. 3. The teeth 36 may be spaced such that diametrically-opposed teeth 36 are between 0.295" and 0.300" apart.

Figure 4:
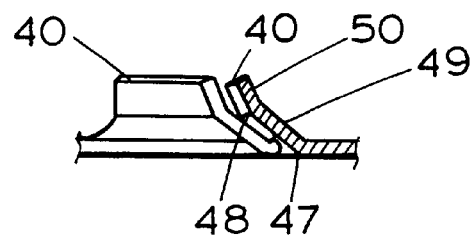
FIG. 4 is a fragmentary, cross-sectional view taken generally along the lines 4—4 of FIG. 2.

The teeth 40 are preferably spaced evenly every 40° around the periphery of the through hole 38 and have 20° gaps between consecutive teeth 40. As shown in FIG. 4, the teeth 40 have a base bend 47 so that the teeth 40 extend from the plane of the main body 36 generally in the first direction. Each tooth 40 further has an intermediate bend 48 to form first and second tooth segments 49, 50. In the illustrated embodiment, the base bend 47 is bent so that an angle of approximately 40° is formed between the first segment 49 and the plane of the main body 36 and an end of the first segment 49 is displaced normal to the plane of the main body 36 in the first direction by about 0.05". The intermediate bend 48 joins the first and second segments 49, 50 and forms an angle of approximately 65° between the second segment 50 and the plane of the main body 36. The second segment 50 also projects generally in the first direction and extends normal to the main body 36 plane approximately 0.035". Accordingly, the normal projection of each tooth 36 in the first direction is approximately 0.085".

Although the teeth 40 are disclosed herein as projecting away from the plane of the main body 36, in alternate embodiments the teeth 40 may be formed in the plane of the main body 36. In one such embodiment, the diametrical spacing of opposed teeth 40 may be substantially equal to the diameter of the shaft and thus may perform the retaining function while remaining in the plane of the main body 36. In a second such embodiment, the teeth 40 may be formed in the plane of the main body 36 such that the spacing of opposed teeth 40 is smaller than the diameter of the shaft onto which the retainer clip 30 is to be installed. In such a configuration, as the retainer clip 30 is pressed onto the shaft, the teeth 40 bend outwardly to accommodate and engage the shaft.

The spring portion 34 extends generally in a second direction opposite the first direction to provide a spring force and comprises six metal tabs 42 at the outer periphery of the main body 36. In the preferred embodiment, portions of the main body 36 are removed to form notches 44 each of size 0.25"×0.06" (before the metal tabs 42 are bent) from the periphery of the main body 36. Three arcuate slots 46 each 70° in extent, are cut in the main body 36 at a 0.435" radius from the center of the through hole 38. The arcuate slots 46 and the notches 44 together define the six metal tabs 42. Each of the metal tabs 42 is bent in the second direction away from the plane of the main body 36 until adjacent metal tabs 42 are 0.12" approximately apart.

The retainer clip 30 is heat treated (or austempered) after the securing and spring portions of the retainer clip 30 are formed. After heat treating, the metal tabs 38 of the retainer clip 30 act like spring members to create a force in the second direction when the tabs are moved in the first direction.

Figure 5:
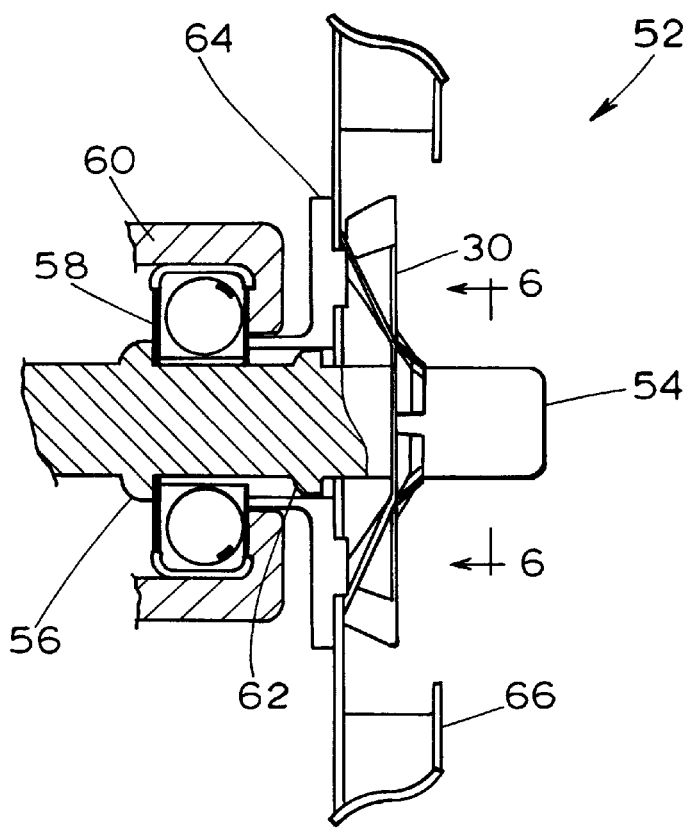
FIG. 5 is a fragmentary, partial sectional view showing a motor assembly including a motor shaft, a keyed spacer, a motor component and a retainer clip assembled together.
Figure 6:
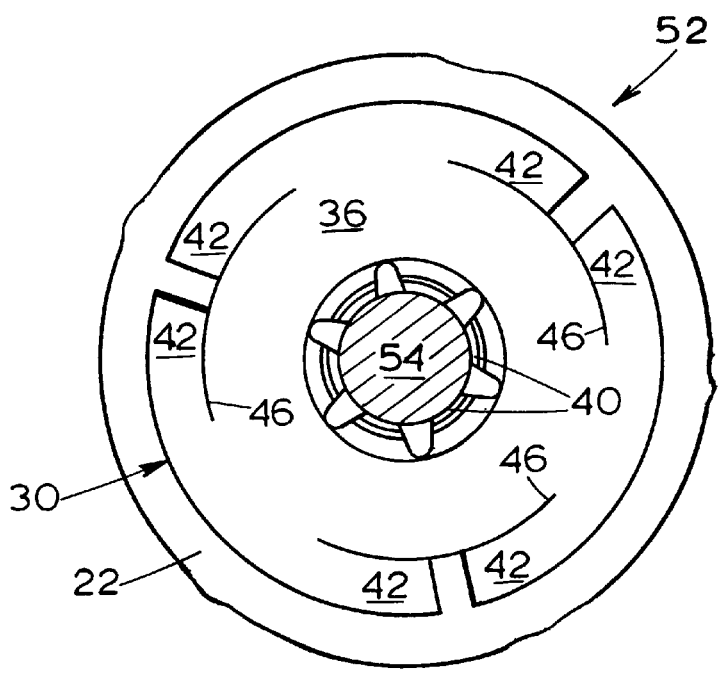
FIG. 6 is a cross-sectional view taken generally along the lines 6—6 of FIG. 5.

One application of the retainer clip 30 is in a motor assembly 52 as seen in FIGS. 5 and 6. The retainer clip 30 eliminates the need for a threaded shaft and a hex nut to retain components on the motor shaft. Additionally, the retainer clip 30 may be quickly and easily installed. Accordingly, the retainer clip 30 reduces both material cost (because the expensive threaded shaft and hex nut are eliminated) and labor cost (because it is quick and easy to install).

The motor assembly 52 includes a motor shaft 54, which may be unthreaded, a first upset portion 56, a bearing 58, a motor housing 60, a second upset portion 62, a keyed spacer 64, a motor component in the form of an impeller 66 and the retainer clip 30. After the motor shaft 54 and the bearing 58 are installed into the motor housing 60, and the second upset portion 62 is formed on the motor shaft 54, the keyed spacer 64 and the impeller 66 are placed onto the motor shaft 54. The keyed spacer 64 is keyed (i.e., it includes to axial recesses) to receive the second upset portion 62 and is placed onto the motor shaft 54 into abutment with the bearing 58. The motor assembly 52 is completed by sliding the retainer clip 30 onto the motor shaft 54 into abutment with the impeller 66.

Once the retainer clip 30 is installed, the teeth 40 engage the motor shaft 54. As the retainer clip 30 is slid onto the motor shaft 54, the metal tabs 42, which are bent in the second direction, begin to contact the impeller 66. As the metal tabs 42 contact the impeller 66, they are pushed in the first direction and begin to exert a force in the second direction against the impeller 66. The force exerted against impeller 66 serves to force the teeth 40 of the retainer clip 30 in the first direction and fly into engagement with the motor shaft 54, thereby ensuring that the retainer clip 30 will not slide off of the motor shaft 54 in the first direction.

Numerous modifications and alternative embodiments of the invention will be apparent to those skilled in the art in view of the foregoing description. For example, the heat treating of the retainer clip 30 may be eliminated if the retainer clip 30 is fabricated from spring steel. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A unitary retainer clip for retaining a component on a shaft, comprising:
    a main body having an outer circumference and a hole for accommodating the shaft;
    a plurality of teeth for engaging the shaft each projecting in a first axial direction and further extending radially inwardly from the main body; and
    a plurality of gapped spring portions integral with the main body and disposed at angular locations outside the outer circumference of the main body, wherein each gapped spring portion includes a pair of opposed ramp portions extending in substantially circumferentially opposed directions and further extending in a second axial direction opposite the first axial direction.

2. The unitary retainer clip of claim 1, wherein each ramp portion is substantially planar.

3. The unitary retainer clip of claim 1, wherein the ramp portions of each pair of opposed ramp portions are separated by a circumferential gap.

4. The unitary retainer clip of claim 1, wherein the each ramp portion is separated from the main body by a slot.

5. The unitary retainer clip of claim 1, wherein each ramp portion is separated from the main body by a substantially arcuate slot.

6. The unitary retainer clip of claim 1, wherein the plurality of gapped spring portions comprises three gapped spring portions.

7. The unitary retainer clip of claim 1, wherein each pair of opposed ramp portions includes a first ramp portion and a second ramp portion and wherein the first ramp portion extends in a first circumferential direction and the second ramp portion extends in a second circumferential direction substantially opposite the first circumferential direction.

8. The unitary retainer clip of claim 1, wherein the main body is substantially planar.

9. A motor assembly comprising:
    a motor shaft;
    a motor component placed on the motor shaft; and
    a unitary retainer clip in abutment with the motor component for retaining the motor component on the motor shaft, wherein the retainer clip includes a main body having an outer circumference and a hole for accommodating the shaft, a plurality of teeth for engaging the shaft each projecting in a first axial direction and further extending radially inwardly from the main body and a plurality of gapped spring portions integral with the main body and disposed at angular locations outside the outer circumference of the main body, wherein each gapped spring portion includes a pair of opposed ramp portions extending in substantially circumferentially opposed directions and further extending in a second axial direction opposite the first axial direction.

10. The motor assembly of claim 9, wherein each ramp portion is substantially planar.

11. The motor assembly of claim 9, wherein the ramp portions of each pair of opposed ramp portions are separated by a circumferential gap.

12. The motor assembly of claim 9, wherein each ramp portion is separated from the main body by a slot.

13. The motor assembly of claim 9, wherein each ramp portion is separated from the main body by a substantially arcuate slot.

14. The motor assembly of claim 9, wherein the plurality of gapped spring portions comprises three gapped spring portions.

15. The motor assembly of claim 9, wherein each pair of opposed ramp portions includes a first ramp portion and a second ramp portion and wherein the first ramp portion extends in a first circumferential direction and the second ramp portion extends in a second circumferential direction substantially opposite the first circumferential direction.

16. The motor assembly of claim 9, wherein the main body is substantially planar.

17. The motor assembly of claim 7, wherein the motor component comprises an impeller.

* * * * *